United States Patent Office 2,696,498
Patented Dec. 7, 1954

2,696,498

PROCESS OF PREPARING (β HALO ALKOXY) BENZOIC ACID

Paul Edward Hoch, Easton, and George Wesley Pedlow, Jr., Lock Haven, Pa., and Robert Lee Sundberg, Alpha, N. J., assignors to General Aniline & Film Corporation, New York, N. Y., a corporation of Delaware No Drawing. Application February 7, 1951,
Serial No. 209,918

6 Claims. (Cl. 260—521)

This invention relates to novel (β-hydroxy-, or β-haloethoxy) benzoic acids and their acid halides and a method of preparing the same.

It has been found that valuable fluorescent compounds can be obtained by condensing an acid halide, usually the acid chloride of (β-haloethoxy) ethyl benzoic acid with a diamino stilbenedisulfonic acid (particularly 4,4' diamino 2,2' stilbene disulfonic acid). However, such β-halo ethoxy)benzoic acids and their acid chlorides have not heretofore been available.

It has now been found that these products may readily be produced in the following manner:

(β-hydroxy ethoxy, or propoxy) benzoic acid is prepared by reacting a hydroxy benzoic acid with 2 or more molar proportions of ethylene or propylene oxide in the presence of an alkaline catalyst to yield β-hydroxyethyl, or β-hydroxypropyl, (β-hydroxy ethoxy or propoxy) benzoate which is then saponified and the saponified product is then acidified to obtain the (β-hydroxyethoxy, or β-hydroxypropoxy) benzoic acid. These reactions proceed as illustrated in the following equation:

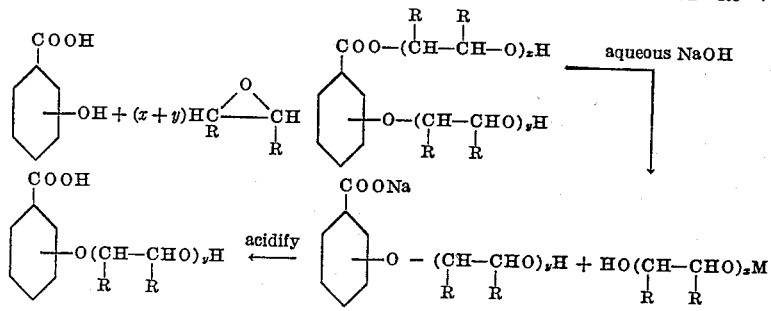

wherein $x$ and $y$ are small integers of from 1 to 3 and having an average value slightly above 1, preferably about 1.1 and one of the R's is H and the other R is H or methyl.

The (β-haloethoxy, or β-halopropoxy) benzoyl halide may then be prepared by treating the thus obtained (β-hydroxyethoxy or propoxy) benzoic acid with an excess of thionyl chloride, or bromide, or phosphorus pentachloride, or bromides, in order to produce (β-chloro, or bromo ethoxy, or propoxy) benzoyl chloride or bromide which, in turn, may be recovered by distillation and used or, if desired, may be hydrolyzed to (β-chloro, or bromo ethoxy) benzoic acid. These reactions may be illustrated by the following equation:

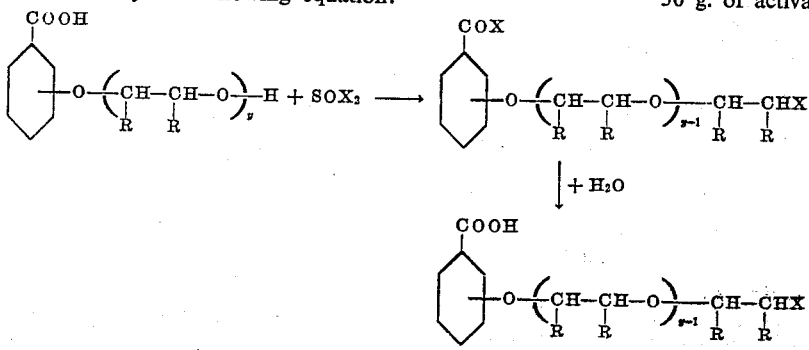

wherein X represents —Cl or Br, and y and R are as defined above.

The details of the present invention will be apparent from a consideration of the following specific example:

Preparation of (β-hydroxyethoxy) benzoic acid

To a mixture of 310.5 g. salicylic acid, 1.55 g. sodium hydroxide and 100 g. chlorobenzene was added 222 g. gaseous ethylene oxide at a pressure of 25–32 lb. p. s. i. g. over a period of 4 hours with good stirring at a temperature of 120–130° C. There was obtained a total of 623.4 g. of product. Assuming the only weight losses are due to escape of ethylene oxide, the mole ratio of ethylene oxide to salicylic acid was 2.16.

600.6 grams of the thus obtained ethoxylated salicylic acid reaction mixture was stirred at reduced pressure while heating on the steam bath to remove chlorobenzene solvent. 522 grams of solvent-free product was obtained.

700 ml. of 3.9 N-sodium hydroxide (2.73 moles NaOH) was added and the resulting mixture was heated on the steam bath 4½ hours. The mixture was allowed to cool to 35° C. and 145 g. conc. $H_2SO_4$ in approximately 150 g. ice was added at a rate to keep temperature from exceeding 40° C. The mixture was transferred to a separatory funnel and 300 ml. methylene chloride was added. The mixture was shaken well and then allowed to separate. The lower layer was drawn off and washed three times (each time with about ⅓ to ½ its volume of water). The lower methylene chloride layer was then placed in a flask equipped with a water separator and the mixture refluxed until little, if any, water appeared to be coming off. The flask mixture was allowed to cool and 150 g. anhydrous sodium sulfate added. After mixing well and allowing to stand for a short time, the drying agent was filtered off and the process repeated with an additional 150 g. of anhydrous $Na_2SO_4$ (and filtered). The filtrate was placed in a flask and the methylene chloride distilled off at reduced pressure (20–25 mm.) not allowing the temperature to exceed 45° C.

50 g. of activated charcoal (Norite) was added to the resulting oil and the mixture stirred for a short time at room temperature. The charcoal was filtered off by suction. Yield 350 g. (85.5% of theory.)

| Analysis | Found | Calc'd for COOH–C6H4–OCH2CH2OH |
|---|---|---|
| Percent OH | 8.63 | 9.3 |
| Sapon. No | 0 | 0 |
| Acid No | 268 | 308 |
| Neutral equivalent | 209 | 182 |

It is probable that the product, obtained, as above described, contained, in addition to the β-hydroxyethoxy benzoic acid, a small amount of product having a polyglycol ether radical, i. e., compounds in which y in the equation given above was greater than one. It is also possible that a small amount of low polymer (polyester) of the following type was present

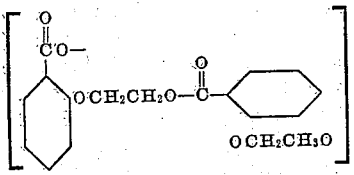

However, it has been found that such "polymeric" products need not be separated. The product purified to the extent indicated is satisfactory for use, for conversion into β-chloroethoxy benzoyl chloride which in turn, probably contain products having a polyglycol ether group but are suitable for use in the form in which they are obtained as described below.

In the reaction of the salicyclic acid with ethylene oxide, it is desirable to carry out the reaction under conditions at which the ethylene oxide, (or propylene oxide if it should be used), reacts primarily only with the carboxyl and phenolic hydroxy groups of the hydroxy benzoic acid and reacts to a minor extent, if at all, with the aliphatic hydroxyls formed. Therefore, preferably only a slight excess of the amount of ethylene or propylene oxide is used—about 2.15 to 2.25 moles per mole of hydroxy benzoic acid and reaction is most advantageously carried out at a temperature of about 130° C. and in the presence of an inert solvent such as chlorobenzene, although other inert solvents may be used, if desired.

It is probable that the product formed in the reaction of ethylene (or propylene) oxide and the hydroxy benzoic acid is a mixture of esters including dimers, trimers and low polymers. By saponification of this reaction product, the sodium salt of desired (β-hydroxy-ethoxy) benzoic acid is obtained and all polymeric products are hydrolyzed to monomers. After acidification of the sodium salt, the product (free acid) is advantageously dried in the presence of an appropriate solvent such as methylene chloride. During this drying, it is important that the temperature be kept low and that sufficient dilution is obtained by the use of methylene chloride (or similar water insoluble solvent for the free acids) so that the free carboxyl groups will not react appreciably with the hydroxy groups available. The free acids are soluble in the methylene chloride and therefore much water, glycols and inorganic salts (formed by neutralization) are conveniently removed due to their insolubility in methylene chloride. As examples of other appropriate solvents for use in place of methylene chloride, there may be mentioned such solvents as ethylene chloride, benzene, pentane, hexane, heptane, toluene, xylene and other higher boiling solvents may be used conveniently if water removal and solvent removal is carried out at reduced pressure to keep temperature low and thus prevent polymerization to the polyester type of polymer previously shown.

*Preparation of 2(β-chloroethoxy) benzoyl chloride*

To 36.4 g. (0.2 mole) of 2-β-hydroxyethoxy benzoic acid prepared as above described was added slowly 150 cc. of thionyl chloride. After the initial reaction ceased, the solution was refluxed for three hours and permitted to stand overnight at room temperature. After removal of the excess thionyl chloride, the acid chloride was distilled in vacuo. The product 2-(β-chloroethoxy) benzoyl chloride was colorless liquid B. P. 144–147/3 mm. which solidified on standing. Yield 20 g.

The thus obtained 2(β-chloroethoxy) benzoyl chloride may be hydrolyzed to the free acid by refluxing with water or by merely allowing to stand in contact with water.

It will be apparent that in place of salicylic acid there may be used meta or para hydroxy benzoic acids in order to obtain products containing the β-hydroxyethoxy group or the β-chloroethoxy group in meta or para position, respectively, the other conditions of reaction remaining substantially the same. Thus, by using m-hydroxybenzoic acid in place of salicylic acid in the above described synthesis there is obtained 3(β-hydroxyethoxy) benzoic acid

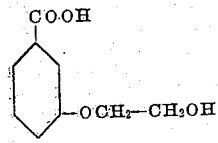

and 3(β-chloroethoxy) benzoyl chloride

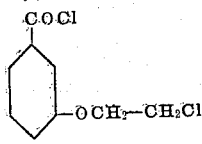

while by using p-hydroxy benzoic acid in place of salicylic acid there is obtained 4(β-hydroxyethoxy) benzoic acid

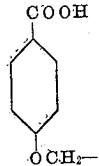

and 4(β-chloroethoxy)benzoyl chloride

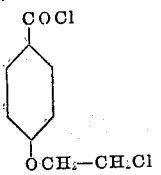

We claim:
1. The method of producing (β-halo alkoxy) benzoic acid which comprises reacting at a temperature of about 130° C. a hydroxy benzoic acid with an alkylene oxide selected from the group consisting of ethylene and propylene oxide in a molar ratio of about 1:2 in an inert solvent and in the presence of an alkaline alkylene oxide condensation catalyst to thereby produce a β hydroxy alkyl (β hydroxyalkoxy) benzoate, saponifying the thus obtained ester to convert it to an alkali salt of (β hydroxyalkoxy) benzoic acid, acidifying at about 40° C. the thus formed salt to convert it to the corresponding acid, mixing the thus acidified product with an inert solvent for the beta-hydroxyalkoxy benzoic acid and drying the same at a temperature below 45° C. treating the thus obtained (β hydroxyalkoxy) benzoic acid with an excess of a halogenating agent selected from the group consisting of thionyl chloride and bromide and phosphorus pentachloride and bromide, whereby there is formed a (β haloalkoxy) benzoic acid halide, and hydrolyzing the thus obtained acid chloride whereby there is formed a (β haloalkoxy) benzoic acid and recovering the same.

2. The processs as defined in claim 1 wherein the alkylene oxide employed is ethylene oxide whereby there is formed and recovered a (β haloethoxy) benzoic acid.

3. The process as defined in claim 2 wherein the halogenating agent specified is thionyl chloride whereby there is formed and recovered a (β chloroethoxy) benzoic acid.

4. The method of producing (β-haloalkoxy) benzoic acid halides which comprises reacting at a temperature of about 130° C. a hydroxy benzoic acid with an alkylene oxide selected from the group consisting of ethylene and propylene oxide in a molar ratio of about 1:2 in an inert solvent and in the presence of an alkaline alkylene oxide condensation catalyst to thereby produce a β-hydroxy alkyl (β hydroxyalkoxy) benzoate, saponifying the thus obtained ester to convert it to an alkali salt of (β hydroxyalkoxy) benzoic acid, acidifying at about 40° C. the thus formed salt to convert it to the corresponding acid, mixing the thus acidified product with an inert solvent for the beta-hydroxyalkoxy benzoic acid and drying the same at a temperature below 45° C. treating the thus obtained (β-hydroxyalkoxy) benzoic acid with an excess of a halogenating agent selected from the group consisting of thionyl chloride and bromide and phosphorus pentachloride and bromide, whereby there is formed a (β haloalkoxy) benzoic acid halide.

5. The process as defined in claim 4 wherein the alkylene oxide employed is ethylene oxide whereby there is obtained a (β-haloalkoxy) benzoic acid halide.

6. The process as defined in claim 5 wherein the halogenating agent specified is thionyl chloride whereby there is obtained a (β-chloroethoxy) benzoic acid chloride.

References Cited in the file of this patent

UNITED STATES PATENTS

| Number | Name | Date |
|---|---|---|
| 2,113,374 | Hall | Apr. 5, 1938 |
| 2,531,502 | De Groote | Nov. 28, 1950 |

FOREIGN PATENTS

| Number | Country | Date |
|---|---|---|
| 213,593 | Germany | Sept. 14, 1909 |
| 412,699 | Germany | Apr. 25, 1925 |
| 470,181 | Great Britain | Aug. 3, 1937 |

OTHER REFERENCES

Boyd et al., J. Chem. Soc. (London), vol. 105, pp. 2137–38 (1914).

Smith, J. Am. Chem. Soc., vol. 62, p. 994 (1940).